J. J. FLACK.
Propelling-Machine.
No. 167,517.
Patented Sept. 7, 1875.
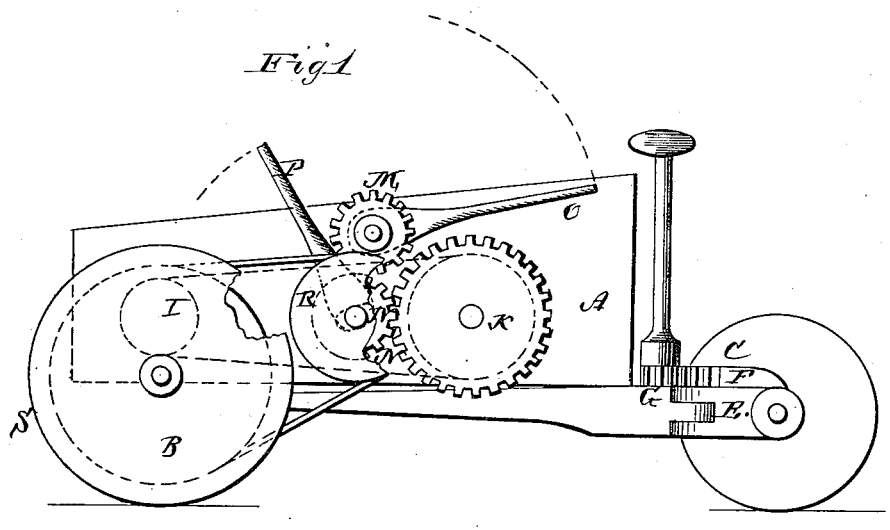
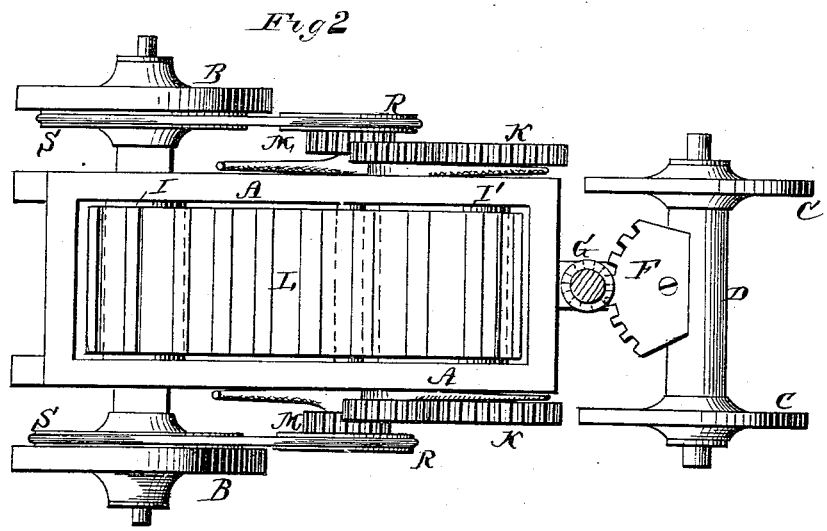
WITNESSES
Franck L. Durand
C. L. Everh.
By
INVENTOR
John J. Flack.
Alexander Mason
Attorneys

UNITED STATES PATENT OFFICE.

JOHN J. FLACK, OF JOLIET, ILLINOIS.

IMPROVEMENT IN PROPELLING-MACHINES.

Specification forming part of Letters Patent No. 167,517, dated September 7, 1875; application filed August 14, 1875.

*To all whom it may concern:*

Be it known that I, JOHN J. FLACK, of Joliet, in the county of Will and in the State of Illinois, have invented certain new and useful Improvements in Propelling-Machines; and do hereby declare that the following is a full, clear, and exact description thereof, reference being had to the accompanying drawings, and to the letters of reference marked thereon, making a part of this specification.

This invention relates to an improved machine for propelling or drawing vehicles for transporting passengers and freight over public highways, railways, and the like, for propelling or drawing canal and other boats, and for driving various kinds of machinery; and it consists in a strong frame mounted upon wheels, and carrying at each end a pulley, drum, or roller, over or around which an endless platform, formed of hinged sections, extends, forming a treadway for a horse or other animal, the axle or journal of one pulley or drum extending through each side of the frame, and communicating, through the medium of suitable gearing, with the main driving-wheels of the apparatus for transmitting motion to the same, substantially as more fully hereinafter described.

In the drawings, Figure 1 represents a side elevation of my improved machine, and Fig. 2 a top view of the same.

The letter A represents a strong rectangular frame, constructed of wood or other suitable material, mounted at the rear upon two wheels, B B, which are the driving-wheels of the apparatus, and in front upon a guide wheel or wheels, C, secured upon a shaft or axle, D, which is attached to a short beam, E, swiveled to the main frame A. The said shaft has attached rigidly to it a section of a cog-wheel, F, which gears into a pinion-wheel, G, upon the lower end of the upright shaft H, by means of which the position of the wheels C is shifted to guide the apparatus. The letters I I' represent two rollers, pulleys, or drums, journaled in opposite sides of the frame A, the shaft or axle of the drum I' passing through the sides of the frame, a cog-wheel, K, being secured to each end of the same. Around said drums or pulleys an endless belt or band, L, passes, being formed of a series of narrow sections of wood, metal, or other suitable material, hinged or linked together, and forming a treadway for a horse or other animal, by which the machine is driven. M and N represent two adjustable cog-wheels, which are mounted upon journals secured to the levers O and P, by which either can be thrown into or out of gear with the cog-wheels K, and into or out of gear with each other, for the purpose to be presently described. The wheels N carry pulleys R R, from which bands, chains, or cords extend, passing around the pulleys S S on the main driving-wheels B B, by which motion is transmitted to the same.

The operation of my apparatus is as follows: The horse or other animal being properly secured within the frame upon the treadway, in stepping throws the same rearward, causing it to revolve and give motion to the drums. The front drum, having the cog-wheels K on its shaft, carries them in the same direction, imparting motion to the gearing, which transmits it in return to the driving-wheels. When the machine is to be driven forward the gear-wheels N are thrown forward by means of the levers P, so as to gear directly with the cog-wheels K, the wheel M being thrown out of gear by means of the lever O. When the motion is to be reversed the wheels N are thrown out of gear with wheels K, and the wheels N thrown in gear with said wheels K and M, changing the direction of the revolution of the wheel M and the pulleys R R and S S.

The carriage is intended to draw a freight or passenger carriage secured behind it, or to propel a similar carriage in front, or to draw or drive canal and other boats secured to it in the same manner. In order to stop or control the speed at pleasure the apparatus is also supplied with brakes, which may operate in contact with the drums or with the other moving parts of the machinery Having described my invention, what I claim, and desire to secure by Letters Patent, is—

The propelling apparatus, consisting of the frame A, mounted upon wheels B B and C C, the pulleys or drums I I', and the cog-gearing K, M, and N, with the pulleys R and S, and driving-wheels B B, the whole being arranged to operate substantially as herein set forth.

In testimony that I claim the foregoing I have hereunto set my hand this 2d day of July, 1875.

JOHN J. FLACK.

Witnesses:
NELSON W. FLACK,
DELISON S. PARK.